United States Patent [19]
Houssa

[11] 3,712,480
[45] Jan. 23, 1973

[54] PROCESS AND MACHINE FOR THE TOASTING OF CUT BREAD

[76] Inventor: Marcel Georges Jean Houssa, 24 rue Marexhe, Liege, Belgium

[22] Filed: April 1, 1970

[21] Appl. No.: 24,549

[30] Foreign Application Priority Data

April 2, 1969 Belgium..............................730,965

[52] U.S. Cl................214/1 Q, 99/386, 198/33 AD
[51] Int. Cl...............................................B65g 7/00
[58] Field of Search......214/1 R, 152, 1, 130, 130 A, 214/8.5 A, 8.5 G, 311, 314; 198/33 RT; 99/352, 355, 386, 387, 400; 107/56, 57

[56] References Cited

UNITED STATES PATENTS

| 1,724,600 | 8/1929 | Kapfhammer | 214/130 A X |
| 3,403,768 | 10/1968 | Tobey et al. | 214/1 Q X |
| 1,958,525 | 5/1934 | Weber | 214/1 Q X |
| 1,696,613 | 12/1928 | Shroyer | 99/386 |
| 2,223,486 | 12/1940 | Filben | 99/387 X |
| 2,945,881 | 10/1960 | Hopton et al. | 214/8.5 A |
| 2,365,007 | 12/1944 | Rideout et al. | 198/33.4 X |
| 2,800,992 | 7/1957 | Kuper | 214/6 C X |
| 3,279,664 | 10/1966 | Lynch | 214/7 X |
| 3,410,425 | 11/1968 | Guillaume | 214/7 |

FOREIGN PATENTS OR APPLICATIONS

| 589,109 | 6/1947 | Great Britain | 99/387 |
| 916,510 | 1/1963 | Great Britain | 214/1 Q |

Primary Examiner—Gerald M. Forlenza
Assistant Examiner—Frank E. Werner
Attorney—Fishman and Van Kirk

[57] ABSTRACT

Apparatus and a process is disclosed for transporting bakery products from a cutter to a rebaking oven in automated fashion. The sliced material is received from a cutter, transported along a conveyer belt until a predetermined number of slices have been loaded on the belt and the load on the belt is thereafter inverted and deposited on a gravity feed mechanism for a rebaking oven.

6 Claims, 3 Drawing Figures

PATENTED JAN 23 1973 3,712,480

INVENTOR
MARCEL G. J. HOUSSA

BY

FISHMAN & VAN KIRK
ATTORNEYS

PROCESS AND MACHINE FOR THE TOASTING OF CUT BREAD

BACKGROUND OF THE INVENTION:

1. Field of the Invention

The present invention relates to the toasting of bakery products which have been cut into desired shapes after the initial baking. More particularly, the present invention is directed to apparatus for automatically transmitting cut bakery products from a slicing apparatus to a rebaking oven. Accordingly, the general objects of the present invention are to provide novel and improved methods and apparatus of such character.

2. Description of the Prior Art

In the manufacture of rusk, biscuits, lady fingers or toasted bread slices, the baked bread coming out of the initial oven is transported toward a cutting machine. The cutting machine will typically slice the bread, while it is still hot from the oven, into slices of equal thickness. The bread will leave the oven on a conveyer belt and, after passing the slicing station, will proceed to a point where the slices are removed from the belt and positioned on an inclined plane. The slices thereafter move down the inclined plane and are distributed, row by row, upon a second conveyer belt that carries the slices into a rebaking or toasting oven. The product coming out of the rebaking oven may, for example, be zwieback, lady fingers or toasted slices.

Conventional industry practice is to have a plurality of employees stationed along the conveyer belt between the cutting apparatus and the inclined plane. It is the function of these employees to manually remove the slices from the belt and position them in the proper order on the plane. The manual transfer from the cutter to the inclined plane requires costly labor and in some localities may not meet the hygienic requirements prescribed for the treatment of food. Nevertheless, due to difficulties in mechanically handling the hot bread slices and the necessity of insuring that crumbs produced by the cutter will not be carried into the rebaking oven, automated transfer of the slices from the cutter to the rebaking oven has previously been deemed impractical.

SUMMARY OF THE INVENTION

The present invention overcomes the above-discussed and other disadvantages of the prior art by providing a process and apparatus which eliminates manual handling by transporting the hot bread slices from the cutter directly to the inclined plane which feeds them toward the rebaking oven.

The preceding objective is accomplished through the use of a unique technique which is performed by apparatus positioned between the cutter and the inclined plane. The apparatus of the present invention employs a transport tray which, when loaded with a predetermined number of bread slices, tilts beyond the vertical and deposits the cut slices upon the inclined plane without the intervention of human hands. The movement of the loaded transport tray is controlled by an adjustable stop or sensor which, in response to the desired load being located on the tray, initiates a sequence of actions. These actions include the stopping of the cutter followed by a complex movement of the transport tray. This complex movement is simultaneous with the de-energization of the drive means for the conveyer, which carries the sliced bread to the adjustable stop on the transport tray, and the producing of a holding action on the slices on the tray. During movement, the tray is rotated over onto the inclined plane which constitutes an initial feed mechanism for the rebaking oven.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

Figure 1:
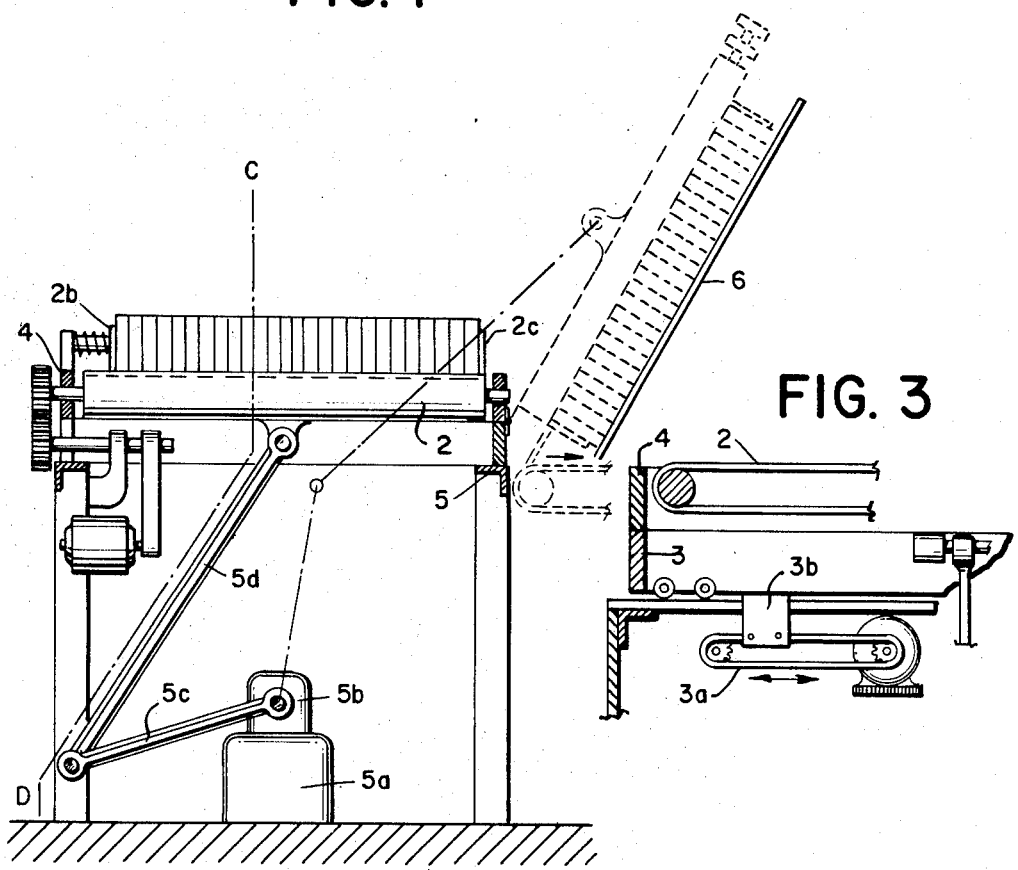
FIG. 1 is a cross-sectional, side elevation view of a preferred embodiment of the present invention; the view in FIG. 1 being taken along line A–B of FIG. 2.
Figure 2:
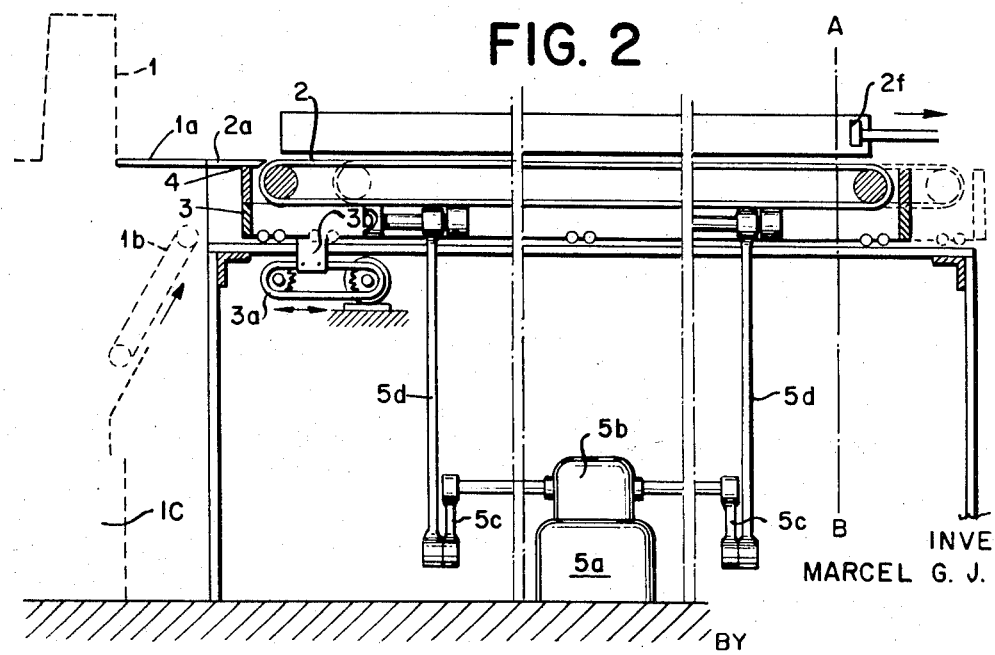
FIG. 2 is a cross-sectional, side elevation view of the embodiment of FIG. 1; the view in FIG. 2 being along line C–D of FIG. 1.

DESCRIPTION OF THE PREFERRED EMBODIMENT:

Considering simultaneously FIGS. 1 and 2, adjacent the front or input side of the present invention will be a cutter mechanism, indicated schematically at 1, of a type known in the art. The cutter mechanism employs blades fastened to a frame at regular intervals, the spaces between the blades corresponding to the desired thickness of the slices to be produced. The cut bread slices are pushed ahead, that is to the right in FIG. 2, by the pushing mechanism of the cutter 1 and thus advance automatically towards the transport tray mechanism of the present invention. This transporting mechanism, in part, comprises a conveyer belt 2 supported on a two part movable frame. The frame includes a lower section 3 and an upper section 4. Upper section 4 has check or side rails 2b and 2c.

The mechanism of the present invention is provided with an apron 1a disposed between cutter mechanism 1 and the conveyer belt 2. Apron 1a is formed from a perforated metal sheet and performs the function of eliminating crumbs resulting from the cutting of the bread. These crumbs, if carried forward into the rebaking oven, would be immediately calcinated and would interfer with the quality of the merchandise. The crumbs falling through the perforations in apron 1a are deposited on a small conveyer belt 1b which carries the debris downwardly and deposits it in a receptacle 1c. Conveyer belt 1b and receptacle 1c do not comprise part of the present invention and thus are shown schematically. The crumbs may, of course, be removed from receptacle 1c either manually or automatically.

The bread slices pushed across apron 1a by cutter 1 slide over a surface 2a and onto the conveyer belt 2. As they travel on conveyer belt 2 toward the position of the rebaking oven, the slices are maintained in a parallel relationship by the check rails 2b and 2c.

The mechanism of the present invention also comprises an adjustable stop member 2f which will be contacted by the bread slices moving on conveyer belt 2.

Stop mechanism 2f will be mechanically coupled to an electrical switch and, accordingly, when the leading edge of the bread slices moving on conveyer 2 contacts stop 2f a control signal will be generated by the closing of the switch coupled to stop 2f. As will be obvious, the position of stop 2f controls the amount of material to be transferred and thus belt 2 may be loaded with a predetermined number of slices; the load on the conveyer belt thereafter being transferred to the rebaking oven feed apparatus in batch fashion.

Upon the closing of the switch associated with stop 2f, through the action of circuitry which has been omitted from the drawing in the interest of clarity, the cutter 1 will be temporarily disabled and the conveyer belt 2 along with frames 3 and 4 will be shifted in a first direction in the manner to be described below. Simultaneously, the driving motor for the conveyer belt 2 will be de-energized. Thereafter, as will also be described below, the load on the conveyer belt will be transferred to the inclined plane 6 of a slice distributor which forms part of the feed mechanism for the rebaking oven.

Figure 3:
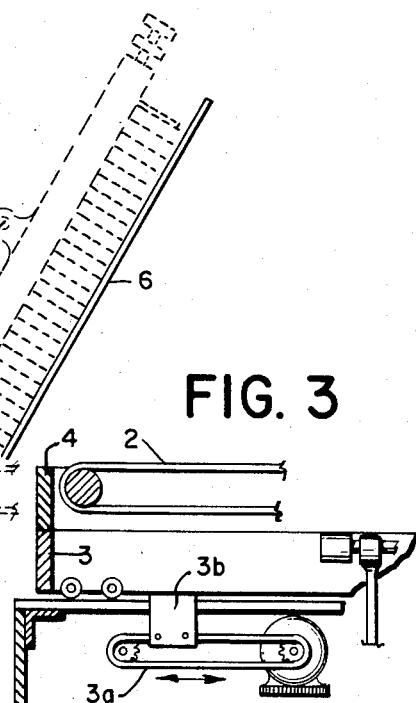
FIG. 3 is a partial, enlarged view of that portion of the mechanism of FIG. 2 which controls movement of the transport tray in a first direction.

As noted above, the conveyer belt 2 is supported from a first frame 4 and frame 4 is in turn mounted, by means of hinges not shown, on a frame 3. Frame 3, which serves as the support means for the drive motor and transmission for conveyor 2, is supported on a table by means of rollers. Considering FIG. 2, frame 3, and thus also frame 4, may be moved horizontally to the right or left by means of a motor and drive chain 3a. Drive chain 3a is coupled to frame 3 via bracket 3b. The motor for drive chain 3a is energized by the closing of the switch associated with adjustable stop 2f. The means for shifting the table horizontally may be better seen from FIG. 3.

In operation, when the load on conveyer belt 2 contacts stop 2f, the horizontal drive motor will be energized and drive chain 3a will cause frames 3 and 4 to move to the right as shown in FIG. 2. This rightward motion will provide clearance between the slide surface 2a and the upper left hand end of frame 4. The amount of horizontal motion of frames 3 and 4 is limited by the closing of electrical contacts, not shown, mounted on a stop carried or contacted by frame 3. The closing of these contacts will simultaneously de-energize the power source for the motor which operates drive chain 3a and energize a third drive motor 5a for the purposes to be discussed below.

The horizontal movement of frames 3 and 4 will position the belt 2 with the bread slices thereon at the level of the slice distributor of the retoasting oven. The energization of motor 5a with the conveyer in the position shown in broken lines in FIG. 2 will, through the action of a pair of cranks, cause the rotation of frame 4 and the conveyer belt 2 to the inverted position known by the broken lines in FIG. 1. This rotation of the frame 4 is achieved by motor 5a through a reducing gear 5b by means of pairs of cranks 5c and 5d. As may best be seen from FIG. 1, during rotation of conveyor belt 2 and the bread slices carried thereby, the frame 4 will pivot about the edge of frame 3 on the aforementioned hinges.

It is to be noted that, prior to the rotation of the conveyer belt 2, side or check rail 2b will be urged toward the other check rail 2c by cams or other suitable means to thereby clamp and hold the bread slices in place during the rotation. The rotation of the cams which cause movement of check rail 2b will also be controlled, in a manner well known in the art, by the closing of the switch associated with adjustable stop 2f.

The feed or distributing mechanism for the retoasting oven comprises, as noted above, an inclined distributor tray 6 which, solely through a gravity feed, delivers the slices to a conveyer belt which passes into the oven. Thus, as soon as the slices come in contact with the surface of the inclined plane 6 that provides the transfer into the oven, the holding check rail 2c will be folded back thereby freeing the slices which are being transferred. The slices will then rest upon any other slices that may already be upon the inclined transfer plane and rows of slices will be picked up by the oven conveyer belt and transported into the retoasting oven. The folding of check rail 2c will be accomplished by means of an electromagnet, not shown, which will be operated by a microswitch contacted by a portion of the frame 4 when it reaches its fully rotated position. The control circuit for the electromagnet will include holding circuitry so that check 2c will not be returned to the upright position until frame 4 has been returned to its starting position.

A timing circuit is employed to cause operation of motor 5a in the reverse direction to return the frame 4 to its starting position. Thus, the frame and conveyer belt will be maintained in the position shown in broken lines in FIG. 1 for a preselected period, determined in part by the speed of the oven feed conveyer belt, and at the termination of this period the motor 5a will be operated in the reverse direction to bring the cranks 5c and 5d back to their initial position. Return of the frame 4 to its initial position will cause de-energization of motor 5a and the electromagnet which has caused the opening of check rail 2c. Simultaneously, the motor which drives the frames 3 and 4 in the horizontal direction will be energized in the opposite direction and the frames and conveyer belt will be moved back toward the cutter 1 by the action of the chain 3a. Return of the conveyer belt to its starting position will, through the closing of another table mounted switch (not shown), start the operating cycle over again by reactivating the cutter 1.

While a preferred embodiment has been shown and described, various modifications and substitutions can be made thereto without departing from the spirit and scope of the present invention. Thus, for example, the means for sensing the loading of conveyer belt 2 may comprise a photo-electric sensing system rather than a mechanical stop which is coupled to an electrical switch. It will also be obvious to those skilled in the art that the various electrical switches and other components of the control circuitry for the present invention may take various forms and it is well within the capabilities of those skilled in the art to interconnect these known components in accordance with the operational mode described above. Accordingly, it is to be understood that the present invention has been described by way of illustration and not limitation.

What is claimed is:

1. Apparatus for transporting bakery products from a first station to a second station, said second station being provided with a feed mechanism including a table inclined with respect to a horizontal plane, said apparatus comprising:

a transfer table;

means permitting delivery of products from the first station onto said transfer table, said delivery permitting means including a perforated plate which prevents the transfer of small particles from said first station onto said table;

means for imparting a limited amount of motion in a first direction to said transfer table; and means for imparting rotational motion to said transfer table when it has reached its limit of motion in the first direction, said rotational motion imparting means driving said transfer table through an angle of greater than 90° but less than 180° whereby the products on said transfer table will be deposited on the inclined table and said products will be delivered to said second station in part with the aid of gravity.

2. Apparatus for transporting bakery products from a first station to a second station, the second station including a movable feed mechanism, the apparatus comprising:

a conveyer belt;

lower frame means movable in a first direction;

upper frame means rotatably supported from said lower frame means, said upper frame means supporting said conveyer belt;

means permitting delivery of products from said first station onto said conveyer belt, said delivery permitting means including a perforated plate for preventing the transfer of small particles between said first and second stations; and means for imparting motion to said frame means whereby articles positioned on said conveyer belt may be transferred to the feed mechanism at said second station.

3. The apparatus of claim 2 wherein said motion imparting means comprises:

means operatively coupled to said lower frame means for causing movement of said upper and lower frame means in said first direction; and means operatively coupled to said upper frame means for rotating said upper frame means about an edge of said lower frame means whereby said conveyer belt and its load may be inverted against the second station feed mechanism.

4. The apparatus of claim 3 wherein said upper frame means further comprises:

a pair of check rails positioned adjacent opposite sides of said conveyer belt, at least one of said rails being movable toward the other rail for clamping the slices in position during rotation of said upper frame means.

5. The apparatus of claim 4 further comprising:

means for sensing the load on said conveyer belt, said sensing means providing an energization command for said means for moving said frames.

6. The apparatus of claim 2 further comprising:

means for sensing the load on said conveyor belt, said sensing means providing an energization command for said motion imparting means.

* * * * *